US012591590B2

(12) United States Patent
Kejriwal et al.

(10) Patent No.: US 12,591,590 B2
(45) Date of Patent: Mar. 31, 2026

(54) REPLICATION OF HOT DATA RANGES IN DISTRIBUTED TRANSACTIONAL KEY-VALUE STORES

(71) Applicant: Snowflake Inc., Menlo Park, CA (US)

(72) Inventors: Ankita Kejriwal, Campbell, CA (US); Lanyue Lu, Saratoga, CA (US); Evan J. Tschannen, Hillsborough, CA (US); Xiaoxi Wang, San Mateo, CA (US); Zhongxing Zhang, San Mateo, CA (US)

(73) Assignee: Snowflake Inc., Menlo Park, CA (US)

( * ) Notice: Subject to any disclaimer, the term of this patent is extended or adjusted under 35 U.S.C. 154(b) by 0 days.

(21) Appl. No.: 18/759,371

(22) Filed: Jun. 28, 2024

(65) Prior Publication Data

US 2026/0003888 A1      Jan. 1, 2026

(51) Int. Cl.
*G06F 16/00* (2019.01)
*G06F 9/50* (2006.01)
*G06F 16/25* (2019.01)
*G06F 16/27* (2019.01)

(52) U.S. Cl.
CPC .............. *G06F 16/27* (2019.01); *G06F 9/505* (2013.01); *G06F 16/256* (2019.01); *G06F 2209/501* (2013.01); *G06F 2209/5022* (2013.01); *G06F 2209/506* (2013.01); *G06F 2209/508* (2013.01)

(58) Field of Classification Search
CPC ........ G06F 16/27; G06F 9/505; G06F 16/256; G06F 2209/501
See application file for complete search history.

(56) References Cited

U.S. PATENT DOCUMENTS

| | | | | |
|---|---|---|---|---|
| 11,747,998 | B1 * | 9/2023 | Indupuru | G06F 3/061 |
| | | | | 711/164 |
| 11,971,902 | B1 * | 4/2024 | Warfield | G06F 16/27 |
| 12,169,487 | B1 * | 12/2024 | Chaturvedi | G06F 16/221 |
| 2018/0121474 | A1 * | 5/2018 | Lee | G06F 16/27 |
| 2019/0294701 | A1 * | 9/2019 | Buda | G06F 16/1844 |
| 2019/0339872 | A1 * | 11/2019 | Kucherov | G06F 11/2094 |
| 2021/0165576 | A1 * | 6/2021 | Koch | G06F 3/0644 |
| 2025/0007918 | A1 * | 1/2025 | Helmick | H04L 63/105 |

FOREIGN PATENT DOCUMENTS

CN          108762665 A  *  11/2018  ........... G06F 3/0676

\* cited by examiner

*Primary Examiner* — Alexander Khong
(74) *Attorney, Agent, or Firm* — Schwegman Lundberg & Woessner, P.A.

(57)          ABSTRACT

A hot server is identified from a plurality of servers based on one or more server metrics associated with the hot server. A hot data range stored by the hot server is identified based on one or more read density metrics. The hot data range comprises a range of data values with a higher volume of access requests compared to other data values stored by the hot server. The hot data range is replicated across a number of additional servers.

20 Claims, 8 Drawing Sheets

400

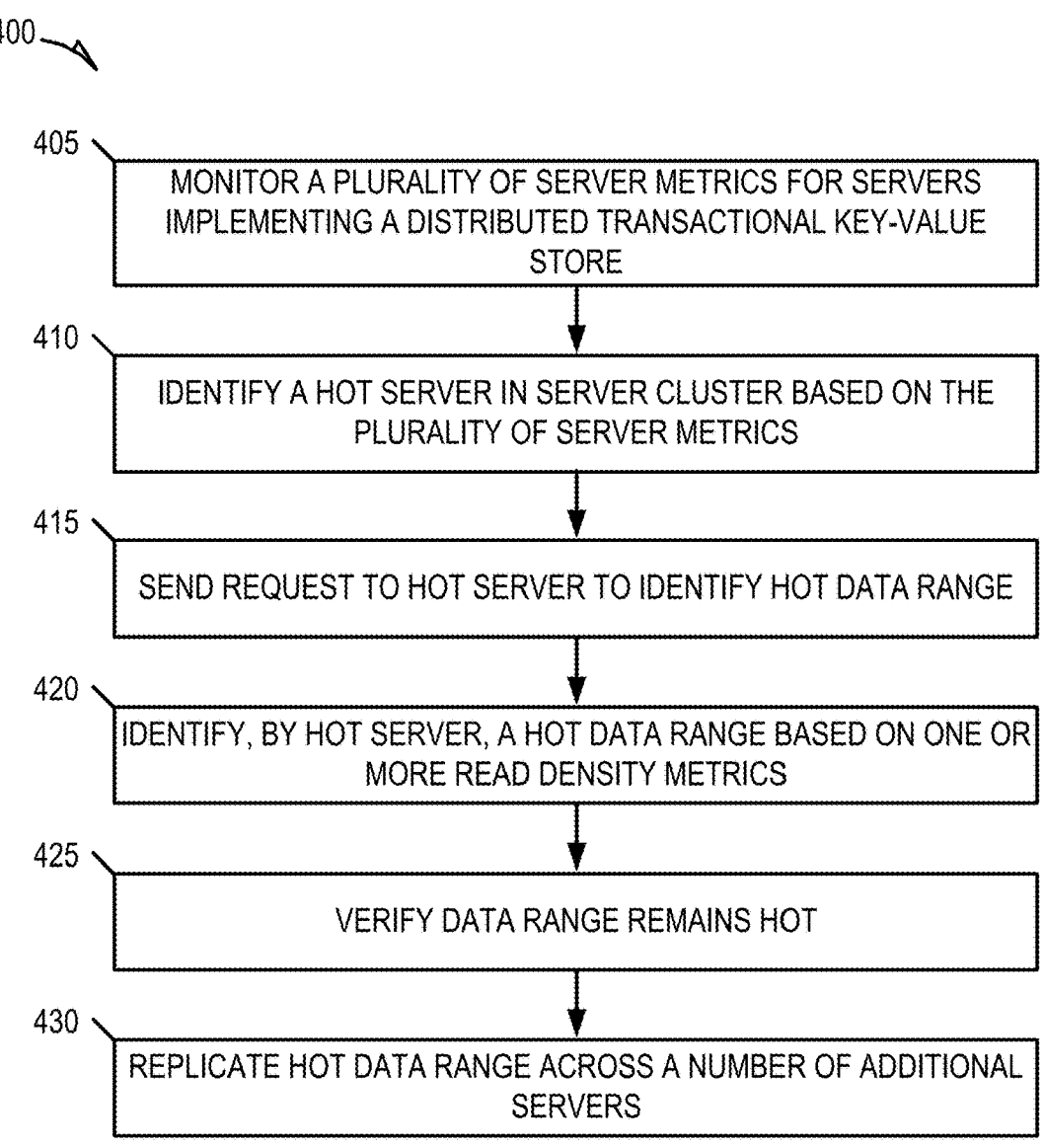

405 — MONITOR A PLURALITY OF SERVER METRICS FOR SERVERS IMPLEMENTING A DISTRIBUTED TRANSACTIONAL KEY-VALUE STORE

410 — IDENTIFY A HOT SERVER IN SERVER CLUSTER BASED ON THE PLURALITY OF SERVER METRICS

415 — SEND REQUEST TO HOT SERVER TO IDENTIFY HOT DATA RANGE

420 — IDENTIFY, BY HOT SERVER, A HOT DATA RANGE BASED ON ONE OR MORE READ DENSITY METRICS

425 — VERIFY DATA RANGE REMAINS HOT

430 — REPLICATE HOT DATA RANGE ACROSS A NUMBER OF ADDITIONAL SERVERS

*FIG. 4*

REPLICATION OF HOT DATA RANGES IN DISTRIBUTED TRANSACTIONAL KEY-VALUE STORES

TECHNICAL FIELD

Embodiments of the disclosure relate generally to cloud data platforms and, more specifically, to replication of hot data ranges in distributed transactional key-value stores in cloud data platforms.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

A data platform may store database data (e.g., a table) in multiple storage units, which may be referred to as partitions, micro-partitions, and/or by one or more other names. A database may be organized as records (e.g., rows or a collection of rows) that each include one or more attributes (e.g., columns). In an example, multiple storage units of a database can be stored in a block and multiple blocks can be grouped into a single file. That is, a database can be organized into a set of files where each file includes a set of blocks, where each block includes a set of more granular storage units such as partitions. It should be understood that the terms "row" and "column" are used for illustration purposes and these terms are interchangeable. For example, data arranged in a column of a table can similarly be arranged in a row of the table.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

FIGS. 4 and 5 are flow diagrams illustrating operations of the cloud data platform in performing a method for replicating hot data ranges in a distributed transactional key-value store of the cloud data platform, in accordance with some embodiments of the present disclosure.

DETAILED DESCRIPTION

Figure 1:
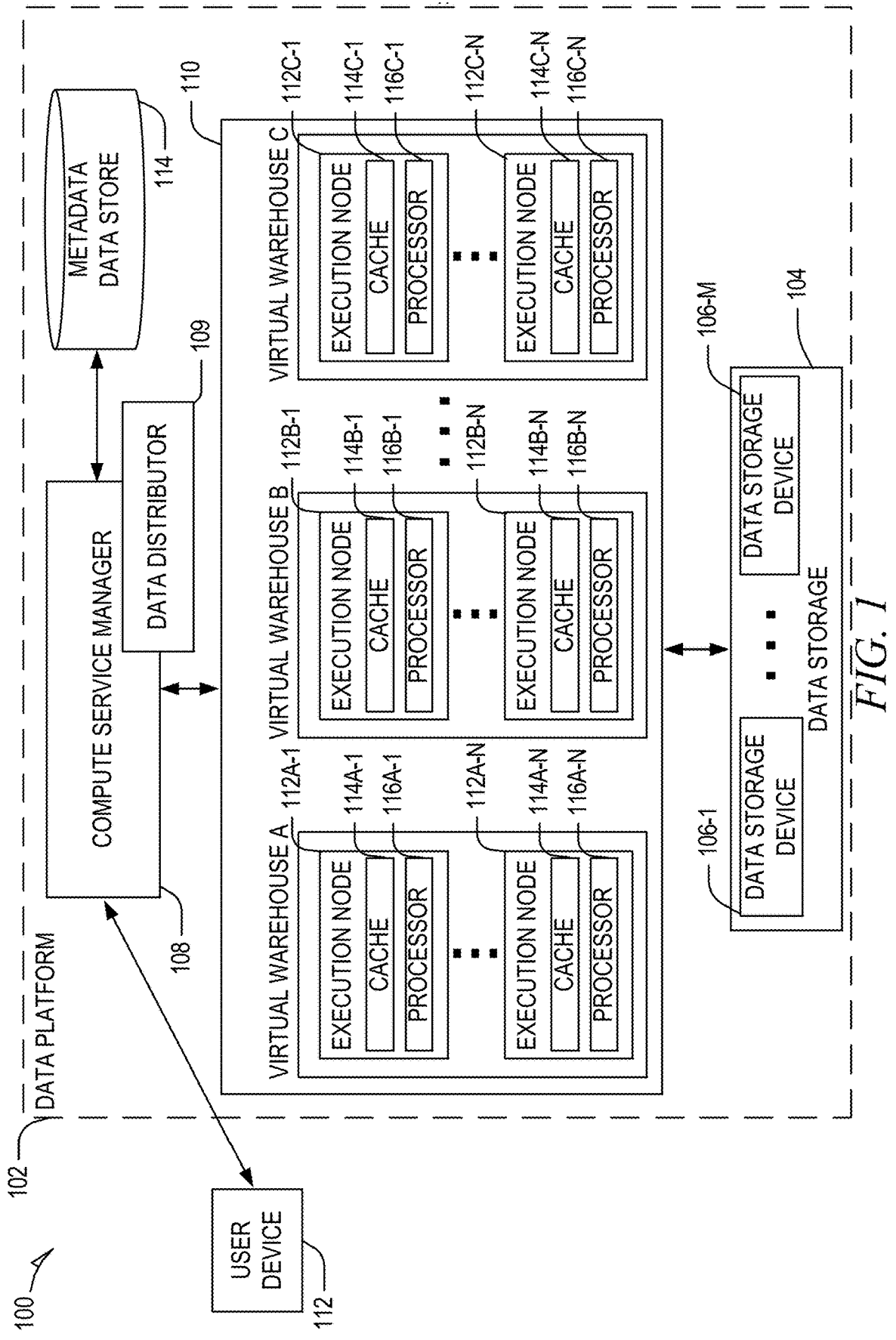
FIG. 1 illustrates an example computing environment that includes a cloud data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Key-value stores are a type of non-relational database that store data as a collection of key-value pairs, where a key serves as a unique identifier for its associated value. This data model facilitates efficient retrieval, insertion, and deletion of data based on the key. Key-value stores are designed to handle large volumes of data and support high-performance applications by offering rapid response times and horizontal scaling. However, these systems often face challenges related to data "hotspots" (also referred to herein as "hot data")—portions of data within the data store that receive a disproportionately high volume of access requests.

Techniques for managing hot data in distributed key-value stores can involve identifying data ranges (referred to as "hot data ranges") that are frequently accessed and manually replicating these data ranges across multiple servers. This replication aims to distribute the load more evenly across the system, thereby reducing the latency and the risk of server overload that might lead to system failures or degraded performance.

A common approach to managing hotspots involves manual monitoring and intervention by system administrators. With this approach, system administrators must continuously analyze traffic and load metrics to identify potential hotspots and then manually initiate data replication processes. This method, while somewhat effective, is labor-intensive and prone to delays between the identification of a hotspot and the mitigation of the associated load. In addition, the process of scaling the number of replicas up or down is typically not automated and requires manual oversight to ensure that the replication does not lead to excessive resource consumption or insufficient capacity to handle peak loads.

Moreover, some systems implement static replication rules that do not account for the dynamic nature of data access patterns. These systems might replicate data based on predetermined schedules or thresholds, which do not always align with real-time demand and can lead to either under or over-utilization of resources.

Another approach involves the use of scripts or automated routines that attempt to predict and react to changes in data access patterns. However, these solutions often rely on simplistic heuristics and may not effectively adapt to the complex and variable nature of database access in large-scale environments.

Aspects of the present disclosure address the foregoing issues, among others, with a data platform, systems, methods, and devices that dynamically manage the replication of hot data ranges in distributed transactional key-value stores. The disclosed data platform includes a data distributor that monitors server metrics to identify hot servers and requests these servers to identify hot data ranges. Upon confirmation that these data ranges are indeed hot, the data distributor dynamically replicates the identified hot data ranges (also referred to as "hot shards") across multiple servers. This replication is adjusted in real-time based on ongoing assessments of the data range's traffic, ensuring efficient load distribution and system performance. The term "hot" is used herein to reference servers and data ranges (shards) that receive a disproportionately high volume of access requests (e.g., read requests). That is, in the context of the present disclosure, a "hot server" refers to a server in a group of servers (e.g., a server cluster) that is receiving a disproportionately high volume of access requests relative to other servers in the group and a "hot data range" refers to a range of data values stored by a server that is receiving a disproportionately high volume of access requests relative to other data values stored by the server.

In an example, a distributed transactional key-value store is implemented on a server cluster comprising multiple servers. A data distributor monitors real-time server metrics of the multiple servers in the server cluster and identifies a hot server based on the server metrics. As an example, the server metrics can include any one or more of: read latency, storage queue size, durability lag, CPU usage, read bandwidth, read frequency, or query queue size. The data distributor identifies the hot server based on determining at least one server metric associated with the hot server exceeds a server metric threshold constraint (e.g., determining that a server metric exceeds a threshold defined by the server metric threshold constraint). The data distributor sends a request to the hot server to identify a hot data range and the hot server in turn identifies a hot data range stored by the server based on one or more data metrics associated with the hot data range. For example, the hot server can identify a hot data range by determining that a data metric associated with the hot data range satisfies a read data metric constraint and that a size of the data range satisfies a size threshold constraint. In response to identifying the hot range stored by the hot server, the data distributor over-replicates the hot data range by generating additional replicas of the hot data range. That is, the data distributor replicates the hot data range across a number of additional servers. The number of additional servers may be fixed or determined dynamically based on the data metrics associated with the hot data range. The data distributor monitors access of the hot data range and upon determining that the data range is no longer hot the data distributor reduces the number of replicas of the data range (e.g., by deleting the hot data range from the number of additional servers).

By dynamically replicating hot data ranges across multiple servers, the data distributor effectively distributes the load, reducing the burden on any single server. This leads to lower latency and faster response times for data access, particularly for data ranges that experience high traffic. Moreover, distributing the load across multiple servers reduces the risk of server overload and potential system failures. This load balancing contributes to overall system stability and ensures higher availability and reliability of the data platform.

In addition, the data distributor's ability to automatically adjust the number of replicas based on real-time traffic conditions allows it to scale efficiently. This scalability is helpful for handling varying loads without manual intervention, making the data platform adaptable to changing usage patterns and growth. The dynamic nature of the replication process ensures that resources are not wasted on over-replicating data ranges that do not require it. By scaling down the number of replicas when traffic decreases, the data distributor conserves storage space and network bandwidth, leading to more efficient resource utilization.

Further, the automation of hot data detection and replication processes eliminates the need for constant manual monitoring and adjustment. This not only reduces the administrative burden but also minimizes the likelihood of human error in managing data replication.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 114, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 114. The metadata data store 114 stores metadata pertaining to various functions and aspects associated with the cloud data platform 102 and its users. The metadata data store 114 also includes a summary of data stored in data storage 104 as well as data available from local caches. Additionally, the metadata data store 114 includes information regarding how data is organized in the data storage 104 and the local caches.

As shown, the compute service manager 108 includes a data distributor 109 that is responsible for identifying and replicating hot data ranges within data stores such as the metadata data store 114. As an example, the data distributor 109 monitors server metrics for a server cluster corresponding to the metadata data store 114, identifies a hot server from the server cluster based on the server metrics, works with the hot server to identify a hot data range, and replicates the hot data range to a number of additional servers. The data distributor 109 is also responsible for cleaning up replicas of the hot data range in response to determining that the data hot range is no longer hot. Further details of the operation of the data distributor 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 114. The metadata data store 114 stores metadata pertaining to various functions and aspects associated with the cloud data platform 102 and its users. The metadata data store 114 also includes a summary of data stored in data storage 104 as well as data available from local caches. Additionally, the metadata data store 114 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state. The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 114, execution platform 110, and data storage 104 are shown in FIG. 1 as individual discrete components. However, each of the compute service manager 108, metadata data store 114, execution platform 110, and data storage 104 may be implemented as a distributed system (e.g., distributed across multiple systems/platforms at multiple geographic locations). Additionally, each of the compute service manager 108, metadata data store 114, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
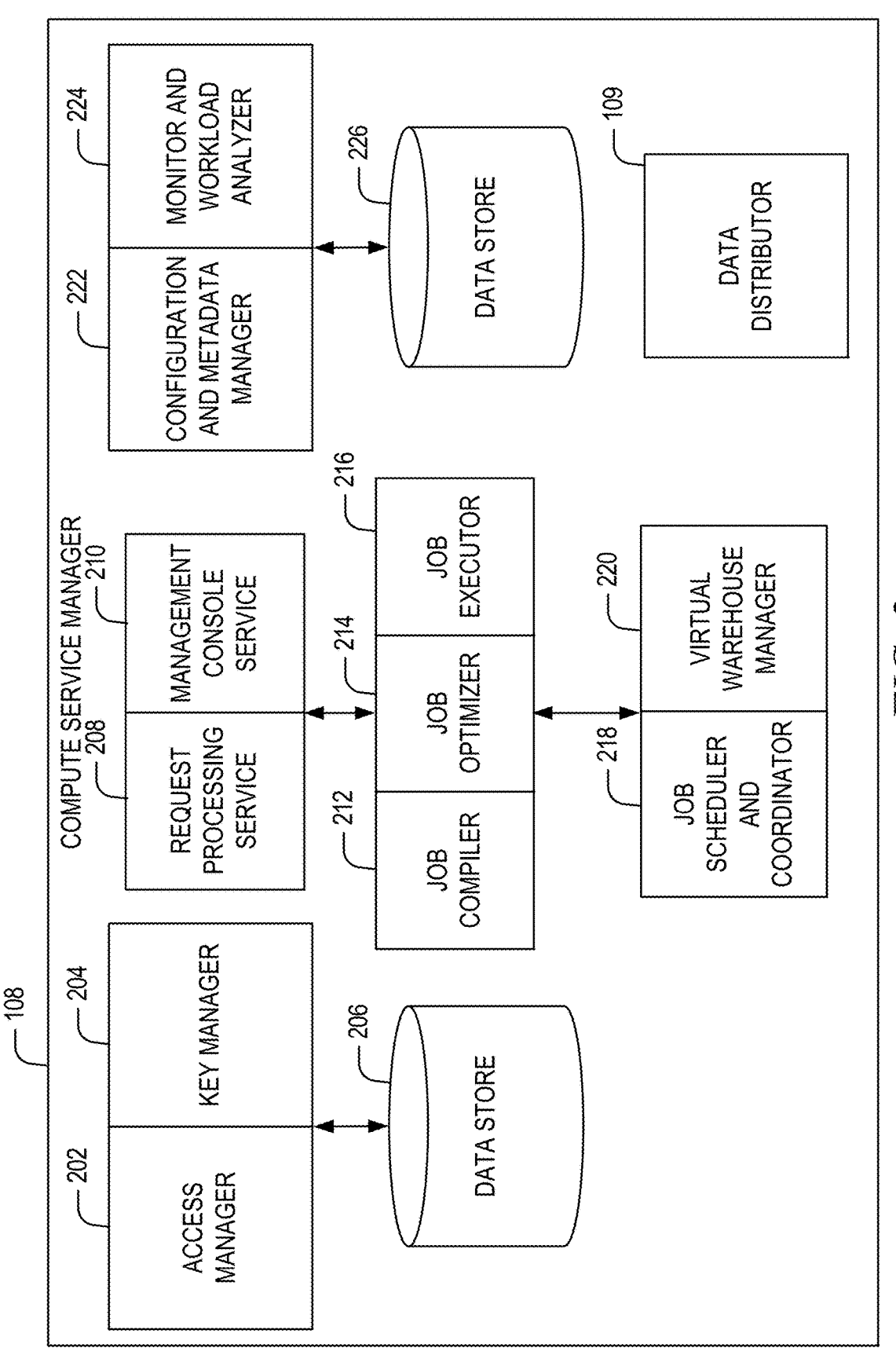
FIG. 2 is a block diagram illustrating components of a compute service manager of the cloud data platform, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 114, or any other storage device or system.

In addition, as mentioned above, the compute service manager 108 includes a data distributor 109 that is responsible for identifying and replicating hot data ranges within data stores such as the metadata data store 114. Further details regarding the functionality of the data distributor 109 in identifying and replicating hot data ranges are discussed below. Although in the examples of FIGS. 1 and 2 the data distributor 109 is illustrated and described as being part of the compute service manager 108, it shall be appreciated that the data distributor 109 is not limited to deployment within the compute service manager 108. In other examples, the data distributor 109 may form part of a distributed transactional key-store such as the metadata data store 114.

Figure 3A:
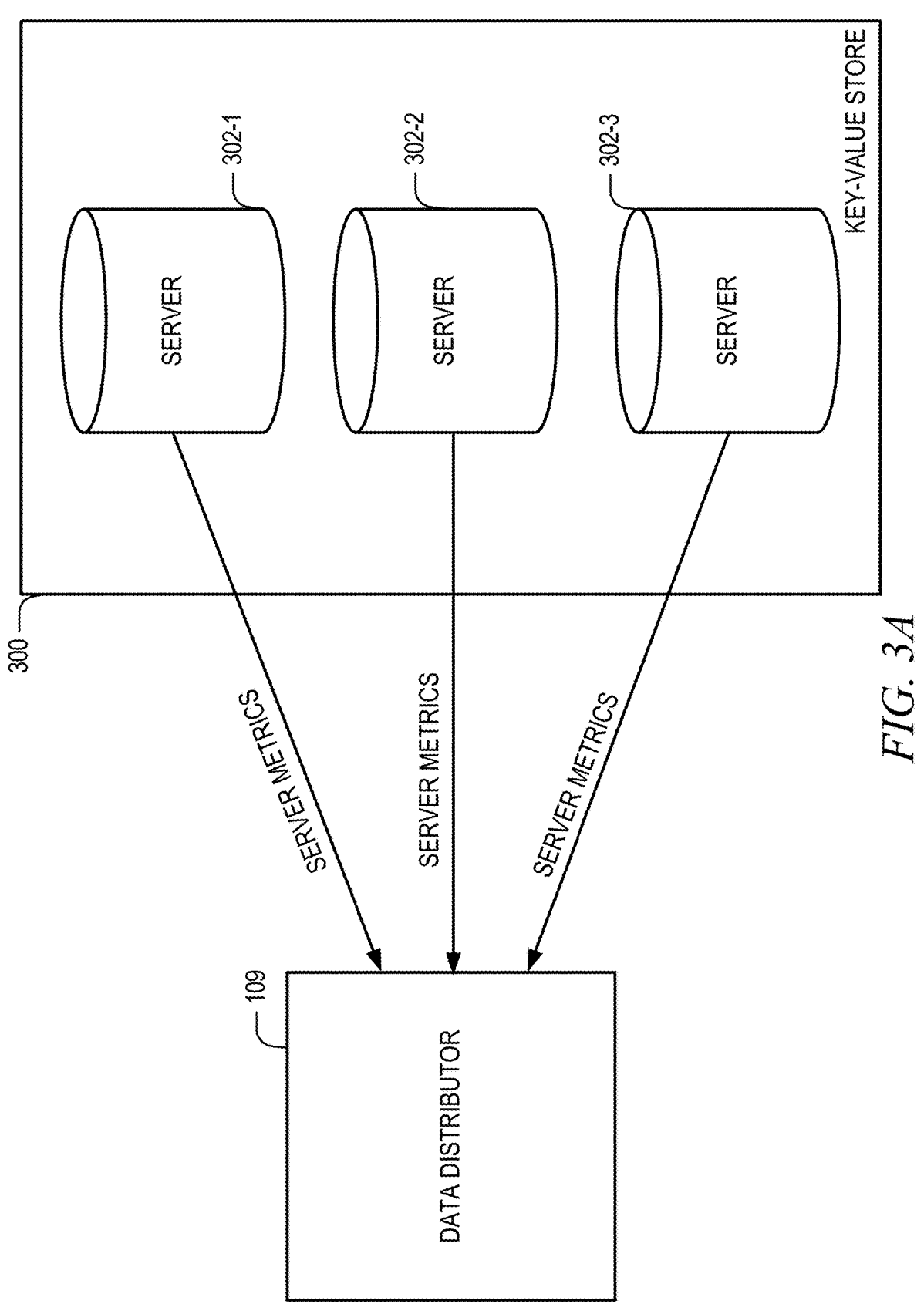
FIGS. 3A-3C are conceptual diagrams illustrating an example method of replicating hot data ranges in a distributed transactional key-value store of the cloud data platform, in accordance with some embodiments of the present disclosure.
Figure 3B:
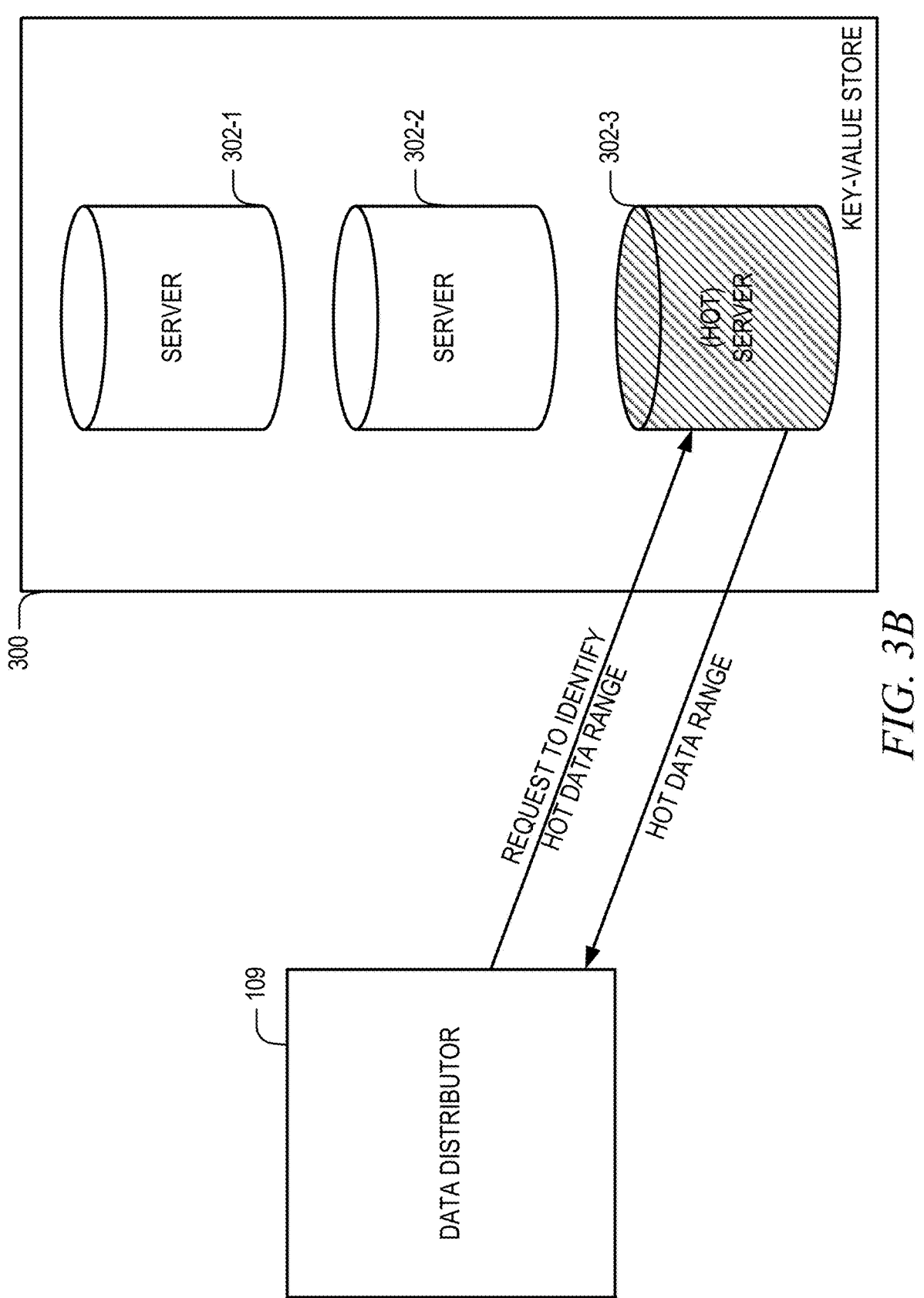
Figure 3C:
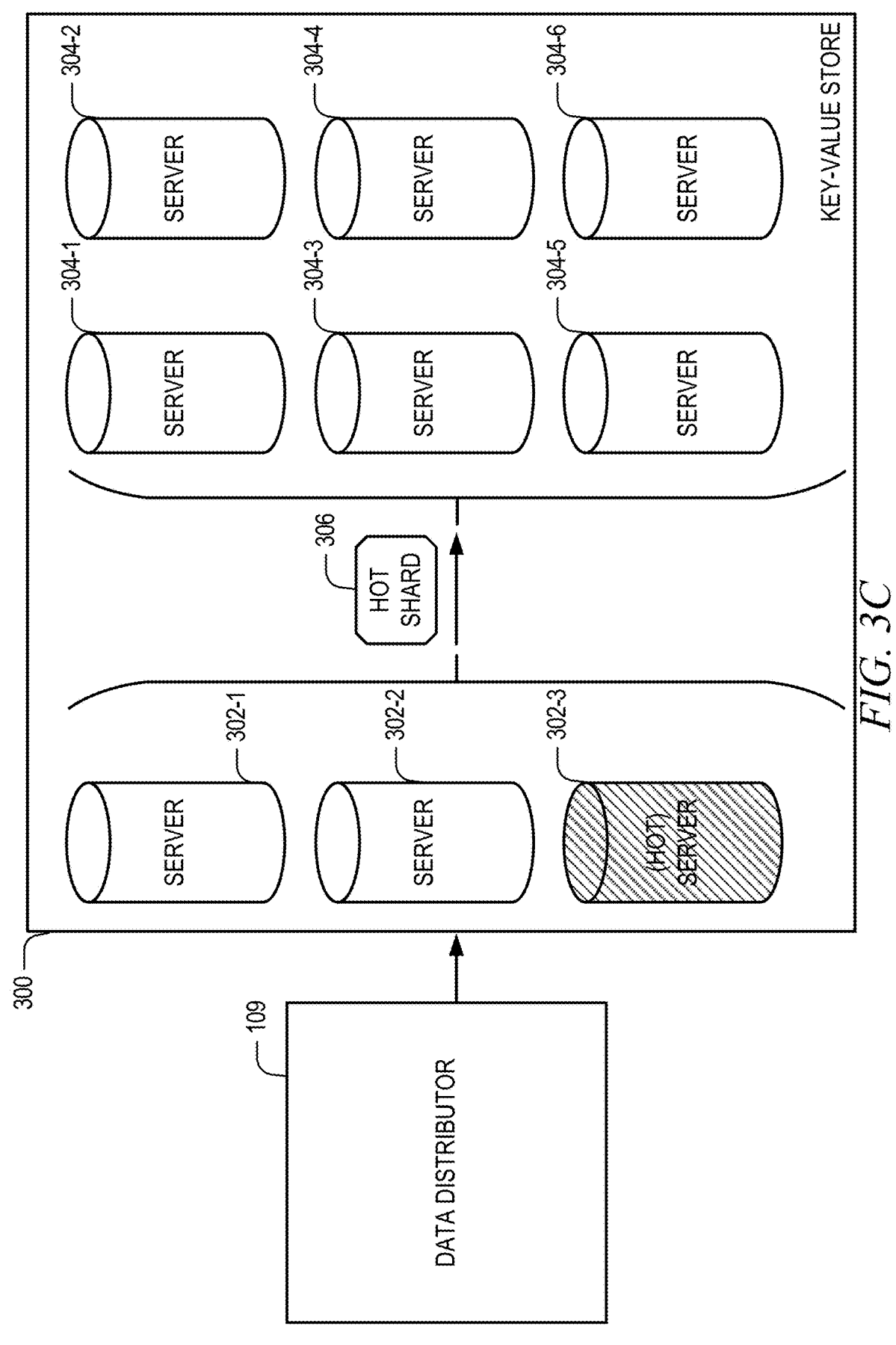

FIGS. 3A-3C are conceptual diagrams illustrating an example method of replicating hot data ranges in a distributed transactional key-value store 300 of the cloud data platform, in accordance with some embodiments of the present disclosure. The distributed transactional key-value store 300 is an example of the metadata data store 114. The distributed transactional key-value store 300 can, in some examples, be implemented via FoundationDB. The distributed transactional key-value store 300 comprises a server cluster comprising multiple servers-servers 302-1 to 302-3. In this example, each of the servers 302-1 to 302-3 stores key-value data of the distributed transactional key-value store 300. That is, in this example, the key-value data is replicated across the servers 302-1 to 302-3.

As shown in FIG. 3A, the data distributor 109 monitors server metrics of each of the servers 302-1 to 302-3. In monitoring server metrics, the data distributor 109 may send requests to the servers 302-1 to 302-3 for the server metrics and/or information from which server metrics can be derived. As an example, the data distributor 109 may monitor any one or more of read latency, CPU usage, durability lag, storage queue size, query queue size, read bandwidth (an amount of data read over a time period), and read frequency (a number of read requests performed at the server over a period of time) for each of the servers 302-1 to 302-3. The data distributor 109 identifies a hot server from servers 302-1 to 302-3 in the distributed transactional key-value store 300 based on the monitored server metrics. The data distributor 109 identifies a hot server based on at least one monitored server metric of the server satisfying a corresponding threshold constraint. As an example, the data distributor 109 can determine a server is a hot server based on any one or more of: a read latency of the server exceeding a read latency threshold, a CPU usage of the server exceeding a CPU usage threshold, a durability lag of the server exceeding a durability lag threshold, a storage queue size of the server exceeding a storage queue size threshold, a query queue size of the server exceeding a query queue size threshold, a read bandwidth of the server exceeding a read bandwidth threshold, or a read frequency of the server exceeding a read frequency threshold.

Here, as shown in FIG. 3B, the data distributor 109 identifies the server 302-3 as the hot server. With continued reference to FIG. 3B, the data distributor 109 sends a request to the server 302-3 to identify a hot data range based on identifying the server 302-3 as a hot server. Based on the request, the server 302-3 (the hot server) identifies a hot data range and sends this information back to the data distributor 109. As noted above, a hot data range comprises a range of data values that are receiving a disproportionately higher volume of access requests related to other data values stored by the server.

In identifying the hot data range, the hot server (server 302-3 in this example) identifies a read-hot range that satisfies a shard size constraint (e.g., <100 MB). To identify a read-hot range, the hot server finds a data range with a read density metric value that satisfies a read-density threshold constraint. For example, the hot server identifies a data range (e.g., that is <100 MB) that has a read density metric value that exceeds a read density threshold. The read density metric of the data range comprises a read bandwidth of the data range, a read frequency of the data range, or a combination thereof.

With reference to FIG. 3C, the data distributor 109 replicates (copies) a hot shard 306 comprising the hot data range over a number of additional servers. As shown by the specific example of FIG. 3C, the data distributor 109 replicates the hot data range over servers 304-1 to 304-6. Given that the hot data range was initially replicated across the servers 302-1 to 302-3, the replication of the hot data range across the additional servers 304-1 to 304-6 is also referred to as "over-replication".

The number of additional servers (also referred to as "additional replicas") is based on a replication factor. In some examples, the replication factor is a fixed number while in other examples the replication factor is determined dynamically. In this example, the replication factor is 2. Thus, given that the hot data range (along with all other data ranges) is initially replicated across three servers (servers 302-1 to 302-3), the data distributor 109 generates 6 additional replicas (2*3) of the hot data range based on the replication factor of 2.

The data distributor 109 monitors read density metrics associated with the hot data range, and upon determining that the hot data range is no longer hot (e.g., based on the read density metric of the data range falling below a read density threshold), the data distributor performs a clean-up of the over-replication of the hot data range. In cleaning up the over-replication, the data distributor 109 causes the data hot range to be deleted from the servers 304-1 to 304-6, thereby returning the number of replicas to 3.

Figure 5:
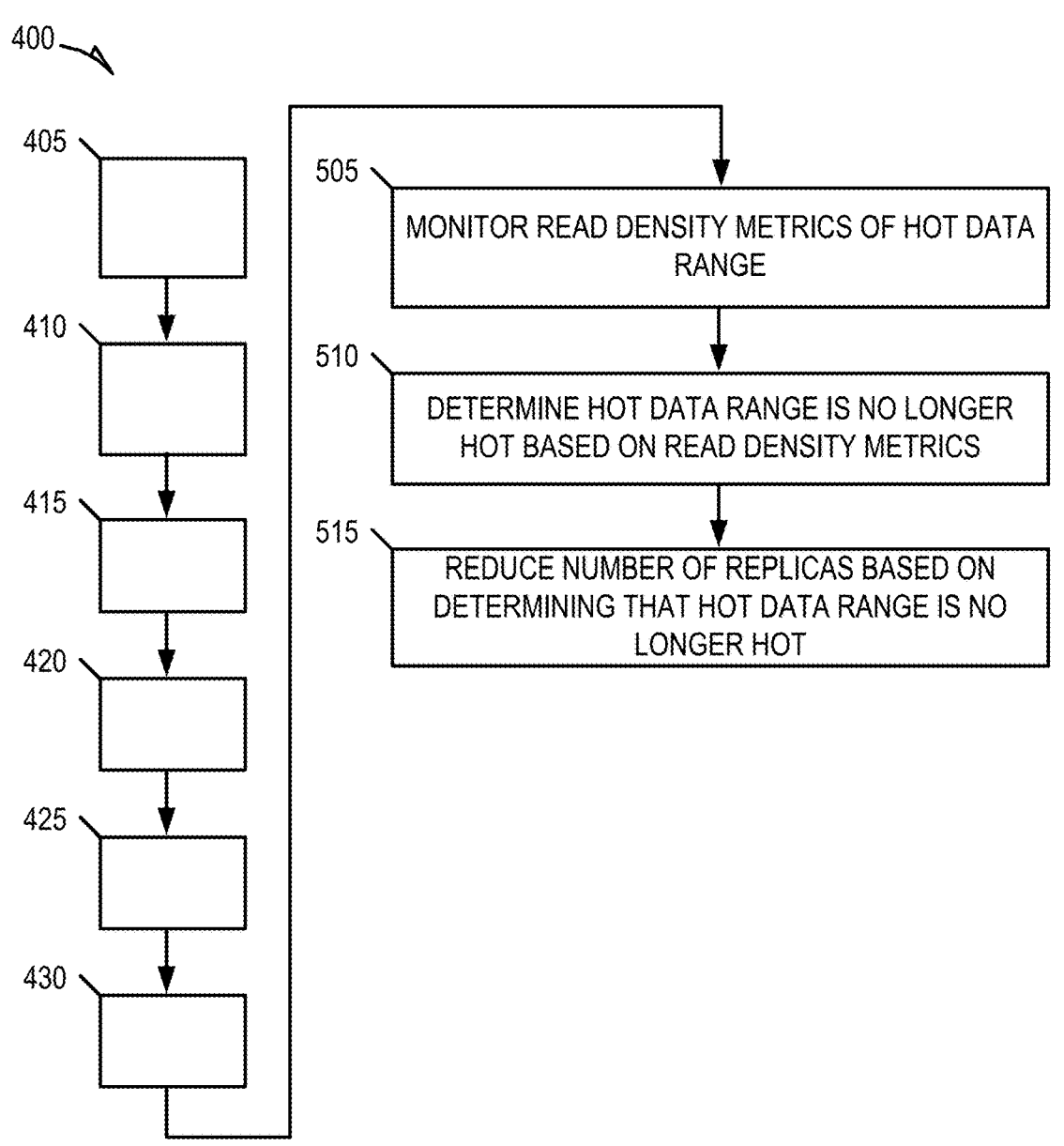

FIGS. 4 and 5 are flow diagrams illustrating operations of the cloud data platform in performing a method 400 for replicating hot data ranges in a distributed transactional key-value store of the cloud data platform, in accordance with some embodiments of the present disclosure. The method 400 may be embodied in computer-readable instructions for execution by one or more hardware components (e.g., one or more processors) such that the operations of the method 400 may be performed by components of cloud data platform 102. Accordingly, the method 400 is described below, by way of example with reference thereto. However, it shall be appreciated that the method 400 may be deployed on various other hardware configurations and is not intended to be limited to deployment within the cloud data platform 102.

Depending on the embodiment, an operation of the method 400 may be repeated in different ways or involve intervening operations not shown. Though the operations of the method 400 may be depicted and described in a certain order, the order in which the operations are performed may vary among embodiments, including performing certain operations in parallel or performing sets of operations in separate processes or separate threads.

At operation 405, the data distributor 109 monitors a plurality of server metrics of servers in the server cluster implementing the distributed transactional key-value store 300 (e.g., metadata data store 114). As noted above, the server cluster comprises multiple servers and the plurality of server metrics monitored by the data distributor 109 includes at least one server metric associated with each server. By way of non-limiting example, the plurality of server metrics can include read latency, storage queue size, durability lag, CPU usage, read bandwidth (an amount of data read over a time period), read frequency (a number of read requests performed at the server over a period of time), or query queue size.

At operation 410, the data distributor 109 identifies a hot server from the server cluster based on the plurality of server metrics. To identify the hot server, the data distributor 109 identifies a server that has at least one server metric value that satisfies a server metric threshold constraint. As a general example, the server metric threshold constraint defines a server metric threshold and the data distributor 109 identifies a hot server based on a corresponding server metric value exceeding the server metric threshold. As a more specific example, the server metric threshold constraint defines a read latency threshold and the data distributor 109 identifies a hot server based on the read latency of the hot server exceeding the read latency threshold.

In response to identifying the hot server, the data distributor 109 sends a request to the hot server to identify a hot data range stored by the hot server, at operation 415. In response to the request, the hot server identifies a hot data range, at operation 420, and communicates this information back to the data distributor 109. The hot server identifies the hot data range based on one or more read density metrics associated with the hot data range. By way of non-limiting example, the one or more read density metrics can include any one or more of read bandwidth or read frequency. In an example, the hot server identifies the hot data range by dividing its key space into multiple chunks and identifying each resulting subrange that has a read density metric value that satisfies a read density threshold constraint (e.g., the read density metric value exceeds a read density threshold) and is smaller than a size threshold. The hot server also identifies sub-ranges that have a ratio of read to write bandwidth that satisfies a threshold constraint (e.g., the ratio of read to write bandwidth exceeds a threshold value) and is smaller than the size threshold. The hot server combines consecutive identified sub-ranges to form larger ranges that are smaller than the size threshold. The hot server identifies the hot data range from the larger formed ranges based on the hot data range having the highest read density metric value.

In response to the hot server identifying the hot data range, the data distributor 109 verifies that the hot data range remains hot, at operation 425. For example, the data distributor 109 may determine based on one or more current read density metrics that have been updated relative to the one or more read density metrics used by the hot server in identifying the hot data range that the hot data range remains hot. That is, the data distributor 109 may determine that the current read density metric value of the data hot range satisfies the read density threshold constraint and/or that the current ratio of read to write bandwidth for the data hot range satisfies the threshold constraint associated with the read to write bandwidth ratio.

Based on verifying that the hot data range remains hot, the data distributor 109 replicates the hot data range across a number of additional servers in the server cluster, at operation 430. That is, the data distributor 109 causes the hot data range to be copied over to the number of additional servers. The number of additional servers is based on a replication factor. In some examples, the replication factor is a pre-determined fixed number. In some examples, the replication factor is dynamically determined based on a comparison of the current read density metric value of the hot data range to a maximum read density constraint.

In view of the disclosure above, various examples are set forth below. It should be noted that one or more features of an example, taken in isolation or combination, should be considered within the disclosure of this application.

As shown in FIG. 5, the method 400 can, in some examples, include operations 505, 510, and 515. Consistent with these examples, the operations 505, 510, and 515 can be performed subsequent to the operation 430 where the data distributor 109 replicates the hot data ranges across a number of additional servers.

At operation 505, the data distributor 109 monitors read density metrics associated with the hot data range. In monitoring the read density metrics, the data distributor determines one or more updated read density metrics reflecting a current state of the hot data range after having been replicated across the number of additional servers.

At operation 510, the data distributor 109 determines, based on the one or more updated read density metrics associated with the hot data range, that the hot data range is no longer hot. That is, the data distributor 109 determines that the hot data range is no longer experiencing a high volume of access requests relative to other data ranges in the data store. The data distributor 109 determines the hot data range is no longer hot by determining at least one of the updated read density metrics does not satisfy the read density metric threshold constraint. In an example, the read density metric threshold constraint defines a read density threshold and the data distributor 109 determines the read density metric value of the data hot range no longer exceeds the read density threshold.

Based on determining that the hot data range is no longer hot, the data distributor 109 reduces a number of replicas of the hot data range, at operation 515. That is, the data distributor 109 causes the hot data range to be deleted from one or more of the additional servers.

In a first example of the operations 510 and 515, the data distributor 109 determines that a replica of the hot data range on one of the additional servers is no longer hot based on read density metrics of the hot data range specifically associated with the additional server, and in reducing the number of replicas, the data distributor 109 deletes the hot data range from the additional server. In a second example of the operations 510 and 515, the data distributor 109 determines that a replica of the hot data range on a first server is no longer hot based on read density metrics of the hot data range specifically associated with the first server, and in reducing the number of replicas, the data distributor 109 deletes the hot data range from a second server storing a replica of the hot data range. In a third example of the operations 510 and 515, the data distributor 109 determines that the hot data range is globally no longer hot based on an aggregate of read density metrics for the hot data range from servers on which it is stored, and in reducing the number of replicas, the data distributor 109 deletes the hot data range from one or more servers, initially starting with the one or more additional servers storing replicas of the hot data range.

In view of the disclosure above, various examples are set forth below. It should be noted that one or more features of an example, taken in isolation or combination, should be considered within the disclosure of this application.

Example 1. A system comprising: at least one hardware processor; and at least one memory storing instructions that cause the at least one hardware processor to perform operations comprising: identifying a hot server from a plurality of servers based on one or more server metrics associated with the hot server; identifying a hot data range stored by the hot server based on one or more read density metrics associated with the hot data range, the hot data range comprising a range of data values with a higher volume of access requests relative to other data values stored by the hot server; and based on identifying the hot data range, replicating the hot data range across a number of additional servers.

Example 2. The system of Example 1, wherein the operations comprising: prior to replicating the hot data range across the number of additional servers, verifying that the hot data range remains hot.

Example 3. The system of any one or more of Examples 1 or 2, wherein: the identifying of the hot range stored by the hot server is performed by the hot server; and the verifying that the hot data range remains hot is performed by a data distributor.

Example 4. The system of any one or more of Examples 1-3, wherein the data distributed sends a request to the hot server to identify the hot data range in response to identifying the hot server.

Example 5. The system of any one or more of Examples 1-4, wherein the number of additional servers is based on a fixed replication factor.

Example 6. The system of any one or more of Examples 1-5, wherein operations comprise determining a replication factor based on a comparison of a current density of the hot data range to a maximum density constraint, wherein the current density of the hot data range is based on one or more of a read bandwidth of the hot data range and a read frequency of the hot data range, wherein the number of additional servers is based on the replication factor.

Example 7. The system of any one or more of Examples 1-6, wherein the one or more server metrics comprise at least one of: read latency, storage queue size, durability lag, CPU usage, read bandwidth, read frequency, or query queue size.

Example 8. The system of any one or more of Examples 1-7, wherein the one or more read density metrics comprise at least one of read bandwidth or read frequency.

Example 9. The system of any one or more of Examples 1-8, wherein identifying the hot server from the plurality of servers comprises determining at least one server metric associated with the hot server satisfies a server metric threshold constraint.

Example 10. The system of any one or more of Examples 1-9, wherein the identifying of the hot data range comprises: determining at least one read density metric associated with the hot data range satisfies a read density metric threshold constraint; and determining a size of the hot data range satisfies a size threshold constraint.

Example 11. The system of any one or more of Examples 1-10, wherein the identifying of the hot data range comprises: determining a ratio of read bandwidth to write bandwidth for the hot data range satisfies a threshold constraint; and determining a size of the hot data range satisfies a size threshold constraint.

Example 12. The system of any one or more of Examples 1-11, the operations comprising: determining, based on updated read density metrics associated with the hot data range, that the hot data range is no longer hot; and based on determining that the hot data range is no longer hot, reducing a number of replicas of the hot data range, the reducing of the number of replicas comprising causing the hot data range to be deleted from one or more servers.

Example 13. The system of any one or more of Examples 1-12, wherein determining that the hot range is no longer hot comprises determining at least one of the updated read density metrics does not satisfy a read density metric threshold constraint.

Example 14. The system of any one or more of Examples 1-13, wherein the plurality of servers implements a key-value store, wherein the hot data range comprises a portion of values stored within the key-value store.

Example 15. A method comprising: monitoring, by a data distributor comprising at least one processor, a plurality of server metrics of a plurality of servers implementing a key-value store; identifying, by the data distributor, a hot server from the plurality of servers based on one or more server metrics of the hot server; identifying, by the hot server, a hot data range stored by the hot server based on one or more read density metrics associated with the hot data range, the hot data range comprising a range of data values with a higher volume of access requests relative to other data values stored by the hot server; and based on identifying the hot data range, replicating the hot data range across a number of additional servers.

Example 16. The method of Example 15, comprising: sending, by the data distributor, a request to the hot server to identify the hot data range in response to the data distributor identifying the hot server; and prior to replicating the hot data range across the number of additional servers, verifying, by the data distributor, that the hot data range remains hot.

Example 17. The method of any one or more of Examples 15 or 16, wherein: the one or more server metrics comprise at least one of: read latency, storage queue size, durability lag, CPU usage, read bandwidth, read frequency, or query queue size; and the one or more read density metrics comprise at least one of read bandwidth or read frequency.

Example 18. The method of any one or more of Examples 15-17, wherein: the identifying of the hot server from the plurality of servers comprises determining at least one server metric associated with the hot server satisfies a server metric threshold constraint; and the identifying of the hot data range comprises: determining at least one read density metric associated with the hot data range satisfies a read density metric threshold constraint; and determining a size of the hot data range satisfies a size threshold constraint.

Example 19. The method of any one or more of Examples 15-18, comprising: determining that the hot data range is no longer hot based on determining at least one of updated read density metric does not satisfy a read density metric threshold constraint; and based on determining that the hot data range is no longer hot, reducing a number of replicas of the hot data range, the reducing of the number of replicas comprising causing the hot data range to be deleted from one or more servers.

Example 20. Computer-storage media comprising instructions that, when executed by one or more processors of a machine, configure the machine to perform operations comprising: monitoring a plurality of server metrics of a plurality of servers implementing a key-value store; identifying a hot server from the plurality of servers based one or more server metrics of the hot server; identifying a hot data range stored by the hot server based on one or more read density metrics associated with the hot data range, the hot data range comprising a range of data values with a higher volume of access requests relative to other data values stored by the hot server; and based on identifying the hot data range, replicating the hot data range across a number of additional servers.

Figure 6:
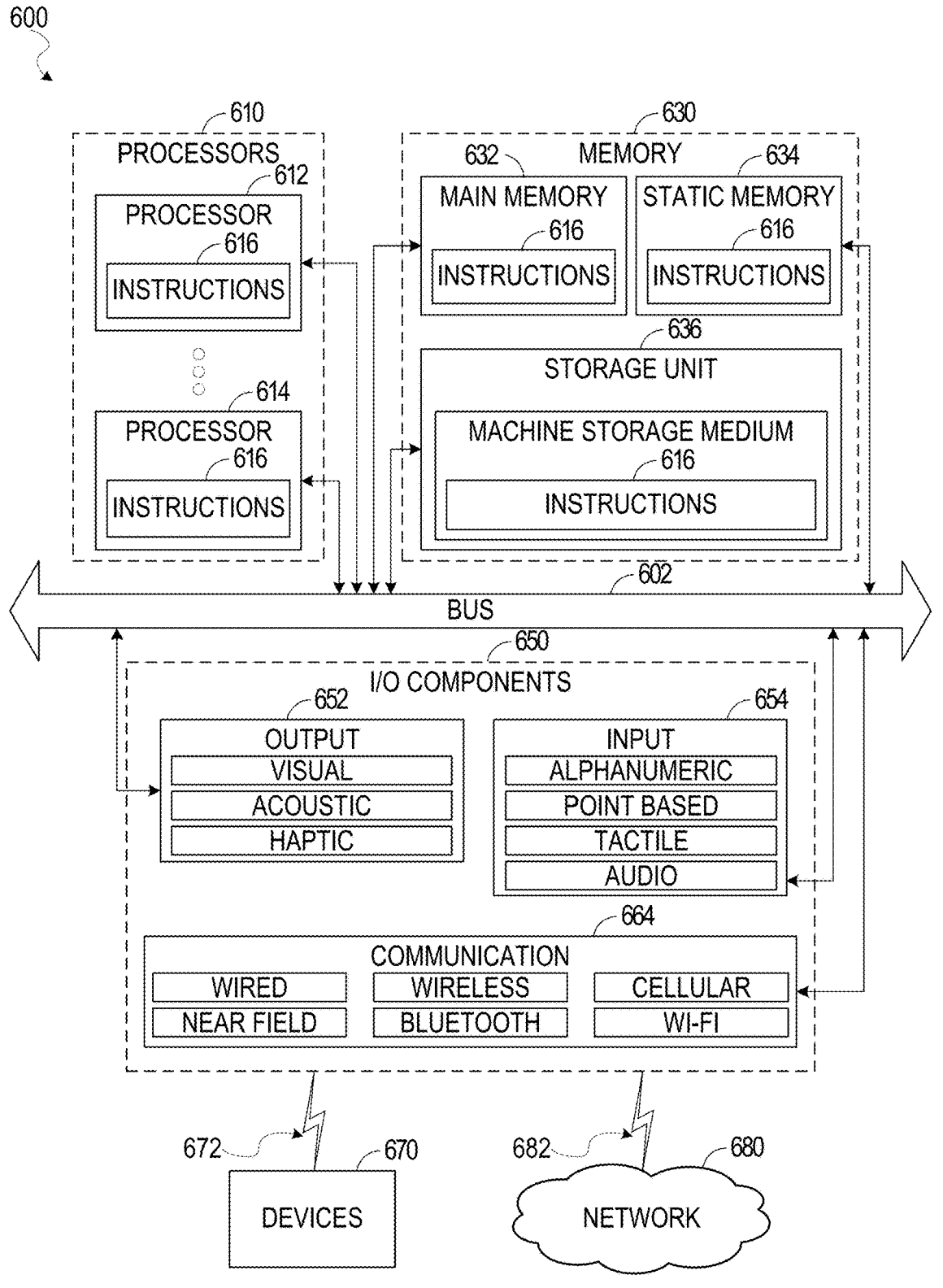
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., a software, a program, an application, an applet, an app, or other executable code) for causing the machine 600 to perform any one or more of the methodologies discussed herein may be executed. For example, the instructions 616 may cause the machine 600 to execute any one or more operations of the method 400. As another example, the instructions 616 may cause the machine 600 to implement any one or more portions of the functionality illustrated in any one of FIGS. 1, 2, and 3A-3C. In this way, the instructions 616 transform a general, non-programmed machine into a particular machine that is specially configured to carry out any one of the described and illustrated functions of the cloud data platform 102 such as the compute service manager 108 (or a component thereof such as the data distributor 109) or an execution node of the execution platform 110.

In some embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and I/O components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 614 and a processor 612 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)). For example, as noted above, the machine 600 may correspond to any one of the compute service manager 108, the execution platform 110, and the devices 670 may include the data store 206 or any other computing device described herein as being in communication with the cloud data platform 102 or the data storage 104.

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 400 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
    identifying a hot server from a plurality of servers based on one or more server metrics associated with the hot server,
    identifying a hot data range stored by the hot server based on one or more read density metrics associated with the hot data range, the hot data range comprising a range of data values with a higher volume of access requests relative to other data values stored by the hot server;
    based on identifying the hot data range, replicating the hot data range across a number of additional servers;
    determining, based on updated read density metrics associated with the hot data range, that the hot data range is no longer hot; and
    based on determining that the hot data range is no longer hot, reducing a number of replicas of the hot data range, the reducing of the number of replicas comprising causing the hot data range to be deleted from one or more servers.

2. The system of claim 1, wherein the operations comprising:
prior to replicating the hot data range across the number of additional servers, verifying that the hot data range remains hot.

3. The system of claim 2, wherein:
the identifying of the hot range stored by the hot server is performed by the hot server; and
the verifying that the hot data range remains hot is performed by a data distributor.

4. The system of claim 3, wherein the data distributed distributor sends a request to the hot server to identify the hot data range in response to identifying the hot server.

5. The system of claim 1, wherein the number of additional servers is based on a fixed replication factor.

6. The system of claim 1, wherein operations comprise determining a replication factor based on a comparison of a current density of the hot data range to a maximum density constraint, wherein the current density of the hot data range is based on one or more of a read bandwidth of the hot data range and a read frequency of the hot data range, wherein the number of additional servers is based on the replication factor.

7. The system of claim 1, wherein the one or more server metrics comprise at least one of: read latency, storage queue size, durability lag, CPU usage, read bandwidth, read frequency, or query queue size.

8. The system of claim 1, wherein the one or more read density metrics comprise at least one of read bandwidth or read frequency.

9. The system of claim 1, wherein identifying the hot server from the plurality of servers comprises determining at least one server metric associated with the hot server satisfies a server metric threshold constraint.

10. The system of claim 1, wherein the identifying of the hot data range comprises:
determining at least one read density metric associated with the hot data range satisfies a read density metric threshold constraint; and
determining a size of the hot data range satisfies a size threshold constraint.

11. The system of claim 1, wherein the identifying of the hot data range comprises:
determining a ratio of read bandwidth to write bandwidth for the hot data range satisfies a threshold constraint; and
determining a size of the hot data range satisfies a size threshold constraint.

12. The system of claim 1, wherein determining that the hot range is no longer hot comprises determining at least one of the updated read density metrics does not satisfy a read density metric threshold constraint.

13. The system of claim 1, wherein the plurality of servers implements a key-value store, wherein the hot data range comprises a portion of values stored within the key-value store.

14. A method comprising:
monitoring, by a data distributor comprising at least one processor, a plurality of server metrics of a plurality of servers implementing a key-value store;
identifying, by the data distributor, a hot server from the plurality of servers based on one or more server metrics of the hot server;
identifying, by the hot server, a hot data range stored by the hot server based on one or more read density metrics associated with the hot data range, the hot data range comprising a range of data values with a higher volume of access requests relative to other data values stored by the hot server;
based on identifying the hot data range, replicating the hot data range across a number of additional servers;
determining, based on updated read density metrics associated with the hot data range, that the hot data range is no longer hot; and
based on determining that the hot data range is no longer hot, reducing a number of replicas of the hot data range, the reducing of the number of replicas comprising causing the hot data range to be deleted from one or more servers.

15. The method of claim 14, comprising:

sending, by the data distributor, a request to the hot server to identify the hot data range in response to the data distributor identifying the hot server; and prior to replicating the hot data range across the number of additional servers, verifying, by the data distributor, that the hot data range remains hot.

16. The method of claim 14, wherein:

the one or more server metrics comprise at least one of: read latency, storage queue size, durability lag, CPU usage, read bandwidth, read frequency, or query queue size; and the one or more read density metrics comprise at least one of read bandwidth or read frequency.

17. The method of claim 14, wherein:

the identifying of the hot server from the plurality of servers comprises determining at least one server metric associated with the hot server satisfies a server metric threshold constraint; and the identifying of the hot data range comprises:

determining at least one read density metric associated with the hot data range satisfies a read density metric threshold constraint; and determining a size of the hot data range satisfies a size threshold constraint.

18. The method of claim 14, wherein determining that the hot range is no longer hot comprises determining at least one of the updated read density metrics does not satisfy a read density metric threshold constraint.

19. Computer-storage media comprising instructions that, when executed by one or more processors of a machine, configure the machine to perform operations comprising:

monitoring a plurality of server metrics of a plurality of servers implementing a key-value store;

identifying a hot server from the plurality of servers based one or more server metrics of the hot server;

identifying a hot data range stored by the hot server based on one or more read density metrics associated with the hot data range, the hot data range comprising a range of data values with a higher volume of access requests relative to other data values stored by the hot server;

based on identifying the hot data range, replicating the hot data range across a number of additional servers;

determining, based on updated read density metrics associated with the hot data range, that the hot data range is no longer hot; and based on determining that the hot data range is no longer hot, reducing a number of replicas of the hot data range, the reducing of the number of replicas comprising causing the hot data range to be deleted from one or more servers.

20. The computer-storage media of claim 19, wherein determining that the hot range is no longer hot comprises determining at least one of the updated read density metrics does not satisfy a read density metric threshold constraint.

* * * * *